(12) United States Patent
Chen et al.

(10) Patent No.: US 10,984,735 B2
(45) Date of Patent: Apr. 20, 2021

(54) WHITE POINT UNIFORMITY IN DISPLAY DEVICES

(71) Applicant: NANOSYS, INC., Milpitas, CA (US)

(72) Inventors: Jian Chen, Saratoga, CA (US); Ernest Lee, Palo Alto, CA (US); Robert E. Wilson, Palo Alto, CA (US); Steven Gensler, San Jose, CA (US)

(73) Assignee: Nanosys, Inc., Milpitas, CA (US)

( * ) Notice: Subject to any disclaimer, the term of this patent is extended or adjusted under 35 U.S.C. 154(b) by 535 days.

(21) Appl. No.: 15/098,608

(22) Filed: Apr. 14, 2016

(65) Prior Publication Data

US 2016/0307519 A1    Oct. 20, 2016

Related U.S. Application Data

(60) Provisional application No. 62/149,017, filed on Apr. 17, 2015.

(51) Int. Cl.
*G09G 3/34* (2006.01)
*G02F 1/13357* (2006.01)
(Continued)

(52) U.S. Cl.
CPC ........... *G09G 3/342* (2013.01); *G02B 6/005* (2013.01); *G02B 6/0073* (2013.01);
(Continued)

(58) Field of Classification Search
CPC .... G09G 3/34; G09G 2320/0233; G09G 3/32; G09G 3/342; G09G 2320/0242;
(Continued)

(56) References Cited

U.S. PATENT DOCUMENTS 6,949,206 B2  9/2005 Whiteford et al.
7,267,875 B2  9/2007 Whiteford et al.
(Continued)

FOREIGN PATENT DOCUMENTS

EP        2 466 994 A2   6/2012

OTHER PUBLICATIONS

Alivisatos, A. P., "Semiconductor Clusters, Nanocrystals, and Quantum Dots," Science, vol. 271, No. 5251, Feb. 16, 1996; pp. 933-937.
(Continued)

*Primary Examiner* — Hovhannes Baghdasaryan
*Assistant Examiner* — Amie M Ndure
(74) *Attorney, Agent, or Firm* — Sterne, Kessler, Goldstein & Fox P.L.L.C.

(57) ABSTRACT

Embodiments of a device and a method of tuning white point values of light distributed by a backlight unit of a display device are described. The device includes a backlight unit, an image generating unit, and a patterned layer. The backlight unit includes a light source unit and an optical processing unit having a quantum dot film coupled to the light source unit. The image generating unit includes a display screen. The backlight unit is configured to distribute light to the display screen and the patterned layer is configured to tune white point values of the distributed light to a desired white point value in order to achieve substantially uniform white point values across the display screen.

20 Claims, 5 Drawing Sheets

(51) Int. Cl.
*F21V 8/00* (2006.01)
*G02F 1/1335* (2006.01)
*G09G 3/32* (2016.01)

(52) U.S. Cl.
CPC .. *G02F 1/133514* (2013.01); *G02F 1/133609* (2013.01); *G09G 3/32* (2013.01); *G02F 1/133606* (2013.01); *G02F 2001/133614* (2013.01); *G02F 2202/36* (2013.01); *G09G 2320/0233* (2013.01); *G09G 2320/0242* (2013.01)

(58) Field of Classification Search
CPC ......... F21V 8/00; G02B 6/005; G02B 6/0073; G02F 1/133606; G02F 2001/133614; G02F 1/1335; G02F 1/133514; G02F 1/133609; G02F 2202/36
See application file for complete search history.

(56) References Cited

U.S. PATENT DOCUMENTS

| | | | |
|---|---|---|---|
| 7,374,807 B2 | 5/2008 | Parce et al. | |
| 7,572,393 B2 | 8/2009 | Whiteford et al. | |
| 7,645,397 B2 | 1/2010 | Parce et al. | |
| 8,283,412 B2 | 10/2012 | Liu et al. | |
| 8,563,133 B2 | 10/2013 | Whiteford et al. | |
| 10,408,987 B2* | 9/2019 | Yamada | G02B 6/0055 |
| 2008/0237540 A1 | 10/2008 | Dubrow | |
| 2009/0162011 A1* | 6/2009 | Coe-Sullivan | G09F 13/22 385/31 |
| 2010/0110728 A1 | 5/2010 | Dubrow et al. | |
| 2010/0314646 A1* | 12/2010 | Breen | B82Y 20/00 257/98 |
| 2011/0031516 A1* | 2/2011 | Basin | H01L 33/507 257/98 |
| 2011/0050735 A1* | 3/2011 | Bae | G02F 1/133603 345/690 |
| 2011/0227487 A1* | 9/2011 | Nichol | G02B 6/0018 315/158 |
| 2011/0233483 A1* | 9/2011 | Breen | B82Y 30/00 252/519.2 |
| 2011/0255303 A1* | 10/2011 | Nichol | G02B 6/006 362/606 |
| 2011/0273906 A1* | 11/2011 | Nichol | G02B 6/0076 362/607 |
| 2011/0277361 A1* | 11/2011 | Nichol | G02B 6/0018 40/541 |
| 2012/0113672 A1 | 5/2012 | Dubrow et al. | |
| 2012/0250350 A1* | 10/2012 | Kim | G02F 1/133603 362/606 |
| 2012/0287381 A1* | 11/2012 | Li | G02F 1/133617 349/106 |
| 2013/0155723 A1* | 6/2013 | Coleman | G02B 6/0018 362/621 |
| 2014/0049983 A1* | 2/2014 | Nichol | G02B 6/0018 362/610 |
| 2015/0300600 A1* | 10/2015 | Dubrow | G02B 6/0055 362/330 |

OTHER PUBLICATIONS

Peng et al., "Epitaxial Growth of Highly Luminescent CdSe/CdS Core/Shell Nanocrystals with Photostability and Electronic Accessibility," Journal of the American Chemical Society, vol. 119, No. 30, 1997; pp. 7019-7029.
Murray et al., "Synthesis and Characterization of Nearly Monodisperse CdE (E=S, Se, Te) Semiconductor Nanocrystallites," Journal of the American Chemical Society, vol. 115, No. 19, 1993; pp. 8706-8715.
International Search Report and Written Opinion of the International Searching Authority directed to related International Patent Publication No. PCT/US2016/027748, dated Jun. 20, 2016; 11 pages.
U.S. Appl. No. 10/796,832, Scher et al., "Process for producing nanocrystals and nanocrystals produced thereby," filed Mar. 10, 2004 (now abandoned); 50 pages.

* cited by examiner

WHITE POINT UNIFORMITY IN DISPLAY DEVICES

BACKGROUND OF THE INVENTION

Field

The present invention relates to display devices including light-emitting diode (LEDs) based backlight units (BLUs) and phosphor films including luminescent nanocrystals such as quantum dots (QDs).

Background

Display devices (e.g., liquid crystal displays (LCDs)) are used as screens or displays for a wide variety of electronic devices and typically require some form of backlighting for images to be visible in normal or reduced ambient light environments. In a backlight unit (BLU) of the display device, LEDs are typically utilized as a light source. The LEDs may be arranged around the edge or perimeter of the display device. The BLU may also utilize phosphors, such as yttrium-aluminum-garnet (YAG) phosphors. Luminescent nanocrystals represent a new, alternative class of phosphors often used in configurations where the phosphor may be placed external to the LEDs. Light emanating from the LEDs may be processed through a light guide plate (LGP) and a phosphor film of the display device to produce white light, which may be distributed across a display screen of the display device. For example, luminescent nanocrystals may be embedded in a flexible film/sheet (e.g., quantum dot enhancement film (QDEF) supplied commercially from 3M Company, St. Paul. Minn. using quantum dots supplied by Nanosys, Inc, Milpitas, Calif.) that may be placed above the LGP of the display device (see, e.g., U.S. Patent Publication Nos. 2010/0110728 and 2012/0113672, which are incorporated by reference herein in their entirety). In other examples, luminescent nanocrystals may be encapsulated in a container, for example a capillary, which may be placed between the LEDs and the LGP (see, e.g., U.S. Patent Publication No. 2010/0110728).

In current display devices, the white point value of the distributed white light may vary across the display screen. The white point value helps to define the color white in terms of a set of chromaticity coordinates, for example, u' and v' coordinates in CIE 1976 color space, where CIE stands for Commission Internationale de l'Eclairage (International Commission on Illumination), as known in the art. Hence, the white point value variation across the display screen may indicate non-uniformity in the hue of the distributed white light. Such variation in white point value across the display screen can interfere with the user's overall experience of the display device. For example, when the display device is used for reading electronic books, the different hues of the white backlight across the display screen can be an annoying distraction for the user.

SUMMARY

Accordingly, there is need to increase the overall quality and user experience of display devices. Disclosed herein are embodiments that overcome the above mentioned limitations of display devices.

According to an embodiment, a device includes a backlight unit having a light source unit and an optical processing unit having a quantum dot film coupled to the light source unit. The device further includes an image generating unit comprising a display screen coupled to the backlight unit, where the backlight unit is configured to distribute light across the display screen. The device also includes a patterned layer configured to tune white point values of the distributed light at different locations on the display screen to a desired white point value in order to achieve substantially more uniform white point values across the display screen.

According to another embodiment, a method of obtaining uniform white point values of light distributed by a backlight unit of a display device includes providing a light source unit, an optical processing unit, an image generating unit, and a layer of patterned material to tune white point values of the distributed light to a desired white point value in order to achieve substantially uniform white point values across the display screen.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1A:
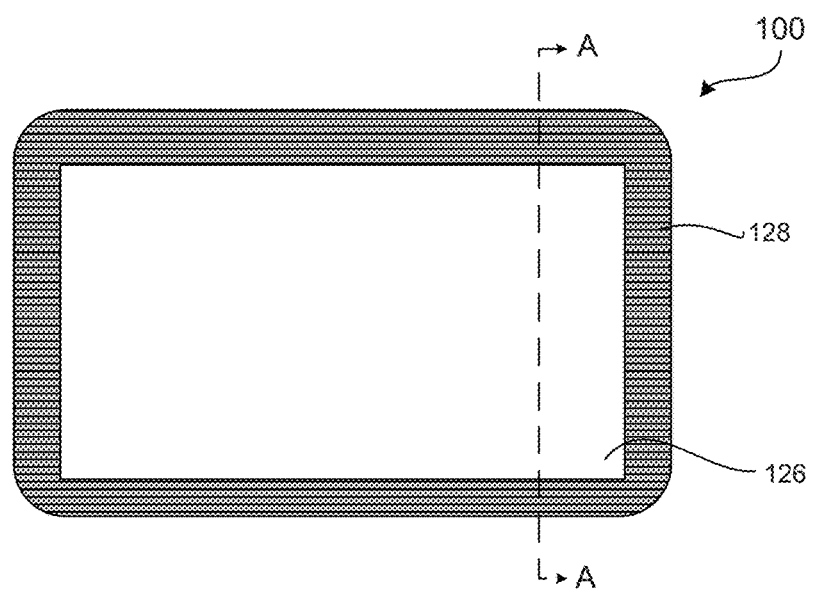
FIG. 1A illustrates a schematic top view of a display device, according to an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number. Unless otherwise indicated, the drawings provided throughout the disclosure should not be interpreted as to-scale drawings.

DETAILED DESCRIPTION OF THE INVENTION

Although specific configurations and arrangements may be discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications beyond those specifically mentioned herein. It should be appreciated that the particular implementations shown and described herein are examples and are not intended to otherwise limit the scope of the application in any way.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

All numbers in this description indicating amounts, ratios of materials, physical properties of materials, and/or use are to be understood as modified by the word "about," except as otherwise explicitly indicated.

In embodiments, the term "display device" refers to an arrangement of elements that allow for the visible representation of data on a display screen. Suitable display screens may include various flat, curved or otherwise-shaped screens, films, sheets or other structures for displaying information visually to a user. Display devices described herein may be included in, for example, display systems encompassing a liquid crystal display (LCD), televisions, computers, mobile phones, smart phones, personal digital assistants (PDAs), gaming devices, electronic reading devices digital cameras, tablets, wearable devices, car navigation systems, and the like.

The term "about" as used herein includes the recited number±10%. Thus, "about ten" means 9 to 11, for example.

In embodiments, the term "forming a reaction mixture" or "forming a mixture" refers to combining at least two components in a container under conditions suitable for the components to react with one another and form a third component.

In embodiment, the terms "light guide plate," "light guide," and "light guide panel" are used interchangeably and refer to an optical component that is suitable for directing electromagnetic radiation (light) from one position to another.

In embodiments, the term "optically coupled" means that components are positioned such that light is able to pass from one component to another component without substantial interference.

The published patents, patent applications, websites, company names, and scientific literature referred to herein are hereby incorporated by reference in their entirety to the same extent as if each was specifically and individually indicated to be incorporated by reference. Any conflict between any reference cited herein and the specific teachings of this specification shall be resolved in favor of the latter. Likewise, any conflict between an art-understood definition of a word or phrase and a definition of the word or phrase as specifically taught in this specification shall be resolved in favor of the latter.

Technical and scientific terms used herein have the meaning commonly understood by one of skill in the art to which the present application pertains, unless otherwise defined. Reference is made herein to various methodologies and materials known to those of skill in the art.

Example Embodiment of a Display Device

Figure 1B:
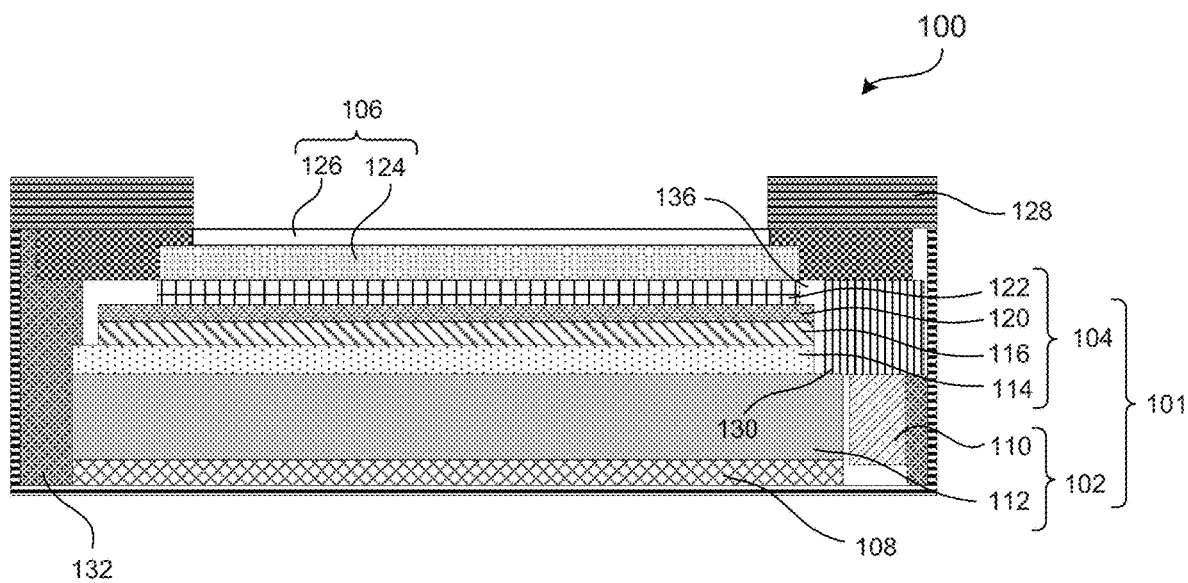
FIG. 1B illustrates a schematic cross-sectional view along line A-A of the display device of FIG. 1A, according to an embodiment.

FIG. 1A illustrates a schematic top view of a display device 100 including a display screen 126 and a bezel 128, according to an embodiment. FIG. 1B illustrates a schematic cross-sectional view of display device 100 along line A-A, according to an embodiment.

As shown in FIG. 1B, display device 100 may comprise a BLU 101 including a light source unit (LSU) 102 and an optical processing unit (OPU) 104, according to an example of this embodiment. Display device 100 may further include an image generating unit (IGU) 106 and a reflector 108, according to an example of this embodiment.

LSU 102 may include an LED 110 (e.g., a blue LED) and an LGP 112. LSU 102 may be configured to provide a primary light (e.g., a blue light) that may be processed through OPU 104 and subsequently, transmitted to IGU 106 to be distributed across a display screen 126 of IGU 106. Various orientations and components of LED 110 are well known to those of ordinary skill in the art. The blue LED may emit in the range from about 440 nm to about 470 nm. According to an embodiment, the blue LED may be, for example, a GaN LED that emits blue light at a wavelength of 450 nm.

LGP 112 may include fiber optic cables, polymeric or glass solid bodies such as plates, films, containers, or other structures, according to various examples of this embodiment. The size of LGP 112 may depend on the ultimate application and characteristics of LED 110. The thickness of LGP 112 may be compatible with thickness of LED 110. The other dimensions of LGP 112 may be designed to extend beyond the dimensions of LED 110, and may be on the order of 10's of millimeters, to 10's to 100's of centimeters.

According to various examples of this embodiment, the materials of LGP 112 may include polycarbonate (PC), poly methyl methacrylate (PMMA), methyl methacrylate, styrene, acrylic polymer resin, glass, or any suitable LGP materials known in the art. Suitable manufacturing methods for LGP 112 may include injection molding, extrusion, or other suitable embodiments known in the art. According to an example of this embodiment, LGP 112 may be configured to provide uniform primary light emission, such that primary light entering OPU 104 may be of uniform color and brightness. LGP 112 may include any thickness or shape known in the art. For example, thickness of LGP 112 may be uniform over the entire LGP 112 surface. Alternatively, LGP 112 may have a wedge-like shape.

LGP 112 may be optically coupled to LED 110 and may be physically connected or disconnected to LED 110, according to various examples of this embodiment. For physically connecting LGP 112 to LED 110, optically transparent adhesive may be used (not shown). The optically transparent adhesive may comprise tape, various glues, polymeric compositions such as silicones, etc., placed between LGP 112 and LED 110. Additional optically transparent adhesive may include various polymers, including, but not limited to, poly(vinyl butyral), polyvinyl acetate), epoxies, and urethanes; silicone and derivatives of silicone, including, but not limited to, polyphenylmethylsiloxane, polyphenylalkylsiloxane, polydiphenylsiloxane, polydialkylsiloxane, fluorinated silicones and vinyl and hydride substituted silicones; acrylic polymers and copolymers formed from monomers including, but not limited to, methylmethacrylate, butylmethacrylate, and laurylmethacrylate; styrene based polymers; and polymers that are cross linked with difunctional monomers, such as divinylbenzene, according to various examples.

In further embodiments, LGP 112 may be physically connected to LED 110, for example, by utilizing a polymeric LGP 112, that when heated melts or deforms such that LED 110 may be contacted to LGP 112 it cools, thereby facilitating the formation of a physical adhesion or contact between the two elements. In further embodiments, optical coupling may be achieved with blue LEDs that have an encapsulant protruding from the LED, for example a protruding polymer surface filled with a compliant encapsulation polymer having a refractive index similar to the refractive index of the light guide plate. In such embodiments, when the light guide plate is pressed against the blue LED, an optical coupling is formed directly between the light guide plate and the LED via the protruding encapsulant, i.e., the encapsulation polymer.

Alternatively, light source unit 102 may include an array of LEDs (not shown), each of which may be similar to LED 110 in structure and function. The array of LEDs may be configured to provide the primary light to the OPU 104 for processing and for subsequent transmission to IGU 106.

According to an embodiment, OPU 104 may be configured to process the light received from LSU 102 to a desired characteristics for transmission to IGU 106. OPU 104 may include, but not limited to, a phosphor film 114, such as the QDEF film mentioned above, a brightness enhancing film (BEF) 116, a diffuser 120, and a reflective polarizing film (RPF) 122. It should be noted that OPU 104 may include more than one diffuser, BEF, and/or RPF without departing from the spirit and scope of the invention, as would be understood by a skilled person in the art. Orientations of these elements of OPU 104, their manufacture and incorporation in display devices are known in the art.

According to an embodiment, phosphor film 114 may be a QDEF including luminescent nanocrystals as described above. In an example embodiment, phosphor film 114 may include a plurality of phosphors (e.g., luminescent nanocrystals) that emit at the same wavelength, for example, at the wavelength corresponding to green light or red light in the visible spectrum. In another example embodiment, phosphor film 114 may include a first plurality of phosphors (e.g., luminescent nanocrystals) that emit at a first wavelength (e.g., wavelength corresponding to green light) and a second plurality of phosphors (e.g., luminescent nanocrystals) that emit at a second wavelength (e.g., wavelength corresponding to red light) that is different from the first wavelength.

In an embodiment, phosphor film 114 may be a downconverter, where at least a portion of the primary light from LSU 102 may be absorbed, for example, by QDs in phosphor film 114 and re-emitted as secondary light having a lower energy or longer wavelength than the primary light. For example, the first plurality of phosphors and the second plurality of phosphors may absorb a portion of the blue light from LSU 102 and be excited to emit green and red secondary lights, respectively. The unabsorbed portion of the blue primary light and the green and red secondary lights may be mixed at a predetermined ratio to produce white light having a desired white point value to be transmitted through IMG 106 and distributed across display screen 126 to serve as a backlight of display device 100, according to an example embodiment. However, display screen 126 may have some locations where white point value of the produced white light is different than the desired white point value. This may be due to mixing of the primary and secondary lights at a higher or lower ratio than the predetermined ratio. For example, edges of display screen 126 may have white light with a bluer hue with respect to other regions on display screen 126. This blue hue in the white light may be due to presence of excess blue light in the mixing ratio of the white light. And, this excess blue light may be unprocessed light from a blue LED of LSU 102 that may have leaked through air gaps (e.g., air gaps 136) in display device 100. As used herein, the term "unprocessed light" refers to any light that has not been processed through OPU 104 to the desired characteristics.

According to an example of this embodiment, BEF 116 may include reflective and/or refractive films, reflective polarizer films, prism films, groove films, grooved prism films, prisms, pitches, grooves, or any suitable BEFs or brightness enhancement features known in the art. For example, BEF 116 may include conventional BEF such as Vikuiti™ or BEF available from 3M™. According to various embodiments, OPU 104 may include at least one BEF, at least two BEFs, or at least three BEFs. In example embodiments, at least one BEF comprises a reflective polarizer BEF e.g., for recycling light which would otherwise be absorbed by RPF 122. The brightness-enhancing features and BEF 116 may include reflectors and/or refractors, polarizers, reflective polarizers, light extraction features, light recycling features, or any brightness-enhancing features known in the art. BEF 116 may include a first layer having pitches or prisms having a first pitch angle, according to an embodiment. Additionally or optionally, another BEF (not shown) in OPU 104 may include a second layer having pitches or prisms having a second pitch angle that is different from the first pitch angle.

In an example embodiment, the brightness-enhancing features of BEF 116 may be configured to reflect a portion of the primary light (e.g., blue light from LSU 102) back toward the QD film, thereby providing recycling of the primary light back into phosphor film 114. Because of light recycling, portions of the primary light may pass through phosphor film 114 multiple times before exiting BLU 101. Light transmitted through BEF 116 may be dependent on the angle at which the light is incident upon BEF 116. For example, light traveling upward from LGP 112 may transmit through BEF 116 if the light is normal or perpendicular to BET 116. However, such light may be reflected downward toward LGP 112 if the light has a higher angle. BEF 116 may be selected to have multiple reflection angles for light of different angles to achieve a desired recycling of the primary light. Such recycling of the primary light may increase optical path length of the primary light in phosphor film 114, resulting in increased absorption of the primary light and increased re-emission of one or more secondary lights, such as but not limited to green light or red light. However, light recycling may not be uniform across display device 100. Towards edges of display device 100, there may be less light recycling since off-angle primary light may be absorbed by frame 132, and consequently, portions of primary and/or secondary light absorbed by frame 132 does not re-enter display device 100. Such non-uniform recycling may result in white light produced by BLU 101 to have white point values higher or lower than the desired white point value, since the primary and secondary lights may be mixed at a ratio higher or lower than the predetermined ratio, as discussed above.

Diffuser 120 is distinct from and supplemental to the scattering features described herein. According to an example of this embodiment, diffuser 120 may include any diffuser film known in the art, including gain diffuser films, and may be disposed above or below BEF 116 or other optical films of display device 100. In example embodiments, phosphor film 114 (e.g., QDEF comprising luminescent nanocrystals) may eliminate the need for a conventional bottom diffuser (not shown), thereby minimizing the thickness of BLU 101. The compositions of phosphor film 114 may also include one or more scattering or diffuser features associated therewith, which may serve the purpose of traditional diffusers in addition to increasing secondary emission of the phosphors in phosphor film 114.

According to another embodiment, IGU 106 may include an LCD module 124 and display screen 126 and may be configured to generate images on display screen 126. Display screen 126 may be a touch screen display, according to an example embodiment.

In a further embodiment, reflector 108 may be configured to increase the amount of light that is emitted from LGP 112. Reflector 108 may comprise any suitable material, such as a reflective mirror, a film of reflector particles, a reflective metal film, or any suitable conventional reflectors. In an example embodiment, reflector 108 may include a white film. In certain embodiments, reflector 108 may comprise additional functionality or features, such as scattering, diffuser, or brightness-enhancing features.

As shown in FIG. 1B, display device 100 further includes LED driving and control unit 130 and a frame 132 configured to support BLU 101. Additionally or alternatively, frame 132 may be configured to hold down phosphor film 114 on LGP 112, according to an example of this embodiment.

Display device 100 may further comprise one or more medium materials (not shown) disposed between any of the adjacent elements in display device 100, for example between LED 110 and LGP 112; between LGP 112 and phosphor film 114; between any different layers or regions within phosphor film 114; between phosphor film 114 and one or more barrier layers (not shown) adjacent to phosphor film 114; between phosphor film 114 and BEF 116, diffuser 120, RPF 122, or other features; and between multiple barrier layers, or between any other elements of display device 100. The one or more medium materials may include any suitable materials, including, but not limited to, a vacuum, air, gas, optical materials, adhesives, optical adhesives, glass, polymers, solids, liquids, gels, cured materials, optical coupling materials, index-matching or index-mismatching materials, index-gradient materials, cladding or anti-cladding materials, spacers, epoxy, silica gel, silicones, any matrix materials described herein, brightness-enhancing materials, scattering or diffuser materials, reflective or anti-reflective materials, wavelength-selective materials, wavelength-selective anti-reflective materials, color filters, or other suitable medium material known in the art. Medium materials may also include optically transparent, non-yellowing, pressure-sensitive optical adhesives. Suitable materials include silicones, silicone gels, silica gel, epoxies (e.g., Loctite™ Epoxy E-30CL), acrylates (e.g., 3M™ Adhesive 2175), and matrix materials mentioned herein. The one or more medium materials may be applied as a curable gel or liquid and cured during or after deposition, or pre-formed and pre-cured prior to deposition. Curing methods may include UV curing, thermal curing, chemical curing, or other suitable curing methods known in the art. Index-matching medium materials may be chosen to minimize optical losses between elements of BLU 101.

Example Embodiment of a Display Device with White Point Correction

Figure 2A:
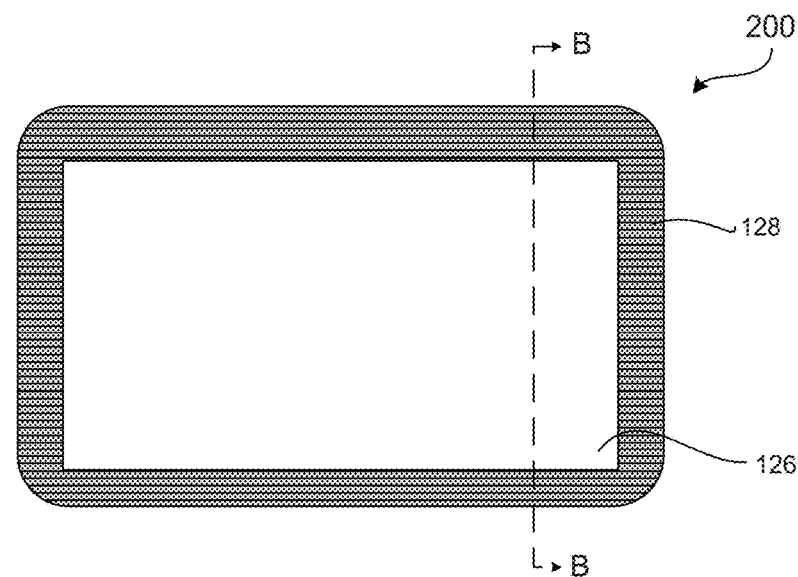
FIG. 2A illustrates a schematic top view of a display device with white point value correction, according to an embodiment.
Figure 2B:
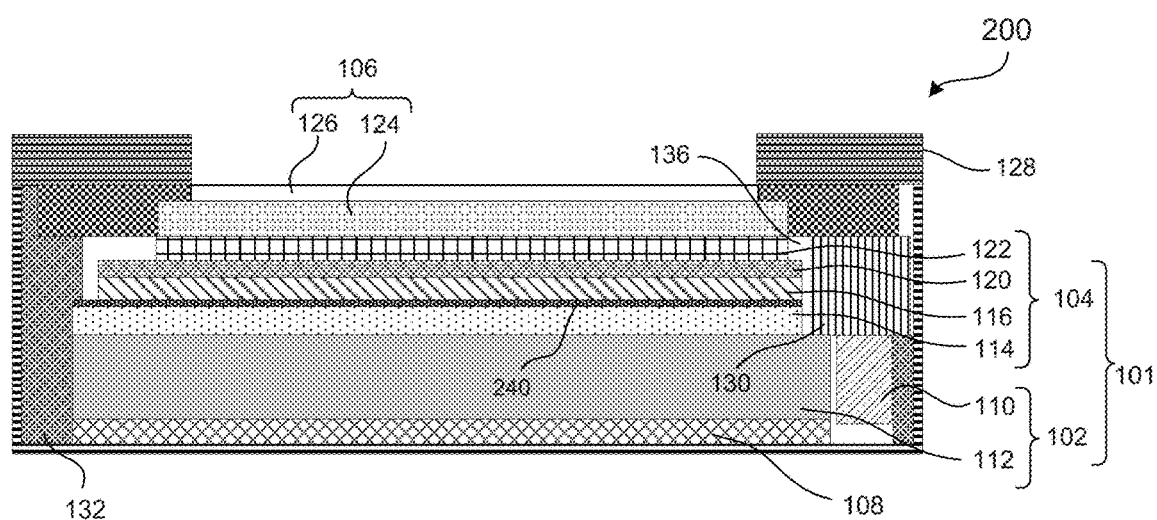
FIG. 2B illustrates a schematic cross-sectional view along line B-B of the display device of FIG. 2A, according to an embodiment.

FIG. 2A illustrates a schematic top view of a display device 200 including a display screen 126 and a bezel 128, according to an embodiment. FIG. 2B illustrates a schematic cross-sectional view of display device 200 along line B-B. Display device 200 may share many similar features and functions with display device 100. Therefore, only differences between display devices 100 and 200 are to be discussed below.

Figure 2C:
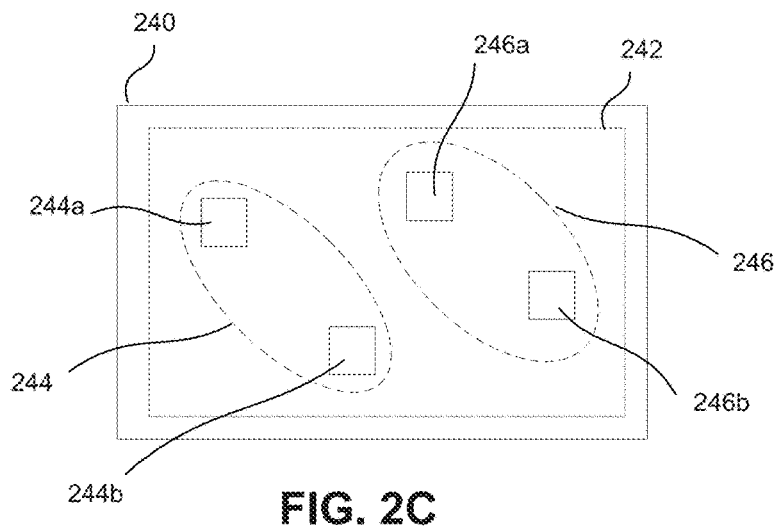
FIG. 2C illustrates a schematic top view of a color correction film of the display device of FIG. 2A, according to an embodiment.

Display device 200 includes LSU 102, OPU 104, and IGU 106, similar to display device 100, as described with reference to FIG. 1B. Display device 200 yet further includes a color correction film 240 disposed on phosphor film 114, as shown in FIG. 2B. Film 240 may be disposed in such a manner that it partially or completely covers top surface of phosphor film 114. Even though film 240 is shown here to be disposed on phosphor film 114, film 240 may be disposed on any structures of BLU 101 and/or IMG 106 without departing from the spirit and scope of the invention. Color correction film 240 may include a layer of patterned material 242, as shown in FIG. 2C that illustrates a schematic top view of color correction film 240, according to an embodiment. Alternatively, layer 242 may be disposed directly on phosphor film 114 (not shown) or any other structures of BLU 101 and/or IMG 106, according to various embodiments.

In an example embodiment, film 240 may comprise an optically transparent material, such as but not limited to a transparency film. According to various embodiments, the material of layer 242 may be ink, paint, dye, polymeric material, organic material, or a combination thereof. Layer of patterned material 242 may be patterned on substrate 240 using, for example, a plotter, an inkjet printer, or a screen printer.

In an example of this embodiment, layer 242 may be configured to correct one or more white point values of the distributed light across display screen 126 in order to eliminate or substantially reduce variation in white point values as discussed above with reference to FIG. 1B. Layer 242 may be configured to absorb any light that may be in excess in the mixture of the light produced by BLU 101 to achieve the desired white Point value of the light, according to an embodiment. For example, if excess blue light is present in white light produced by BLU 101, layer 242 may include a sub-pattern 244 including films of yellow material 244a and 244b having densities that may absorb the excess, blue light to obtain the desired mixing ratio of the white light, and as a result, the desired white point value of the white light. The positions of films 244a and 244b may correspond to locations, on display screen 126 that may be backlit with the excess blue light in absence of layer 242 in display device 200. In another example, if excess red light is present in white light produced by BLU 101, layer 242 may include a sub-pattern 246 including films of cyan material 246a and 246b having densities that may absorb the excess red light to obtain the desired mixing ratio of the white light, and as a result, the desired white point value of the white light. The positions of films 246a and 246b may correspond to locations on display screen 126 that may be backlit with the excess red light in absence of layer 242 in display device 200.

It should be noted that sub-patterns 244 and 246 of layer 242 are for illustrative purposes only and the sub-patterns should not be limited to any particular pattern. Similarly, square shapes of films 244a, 244b, 246, and 246b are for illustrative purposes only and the films of layer 242 should not be limited to any particular shape.

Experimental Example of White Point Correction in a Display Device

Provided herein is an example of white point value correction in a display device using a color correction film as described above with reference to FIG. 2B. The example is not intended to limit the scope or spirit of the invention in any way but is illustrative of an operation of the invention.

Figure 3A:
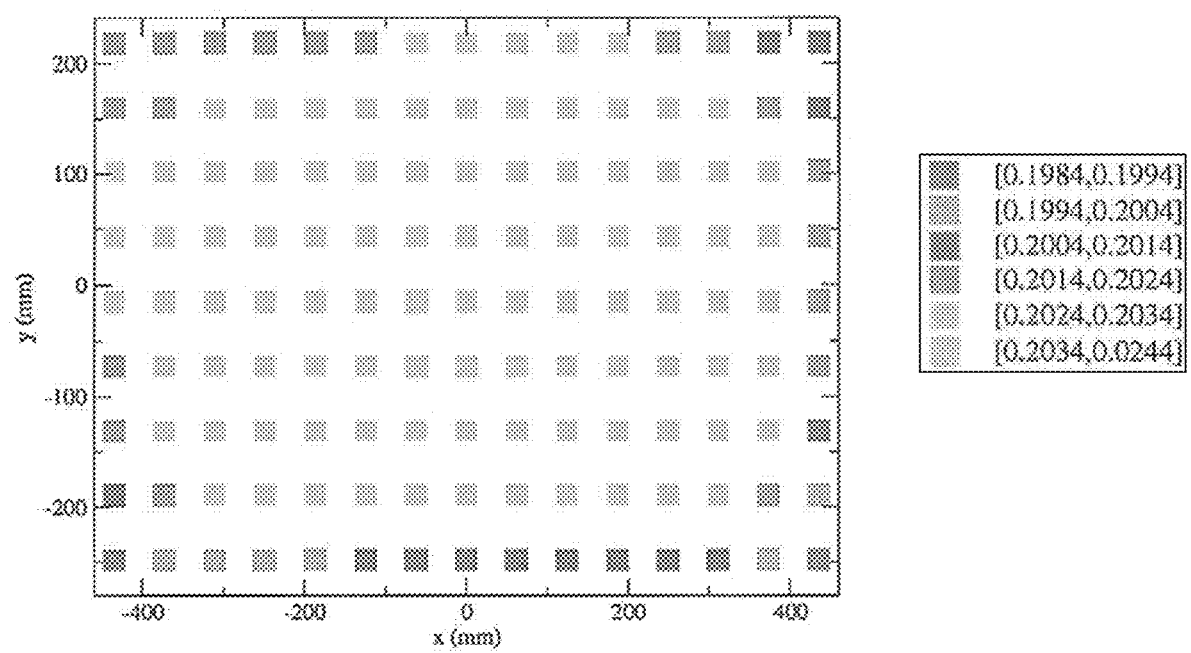
FIGS. 3A-3B illustrate optical measurements of a display device before white point value correction, according to an embodiment.
Figure 3B:
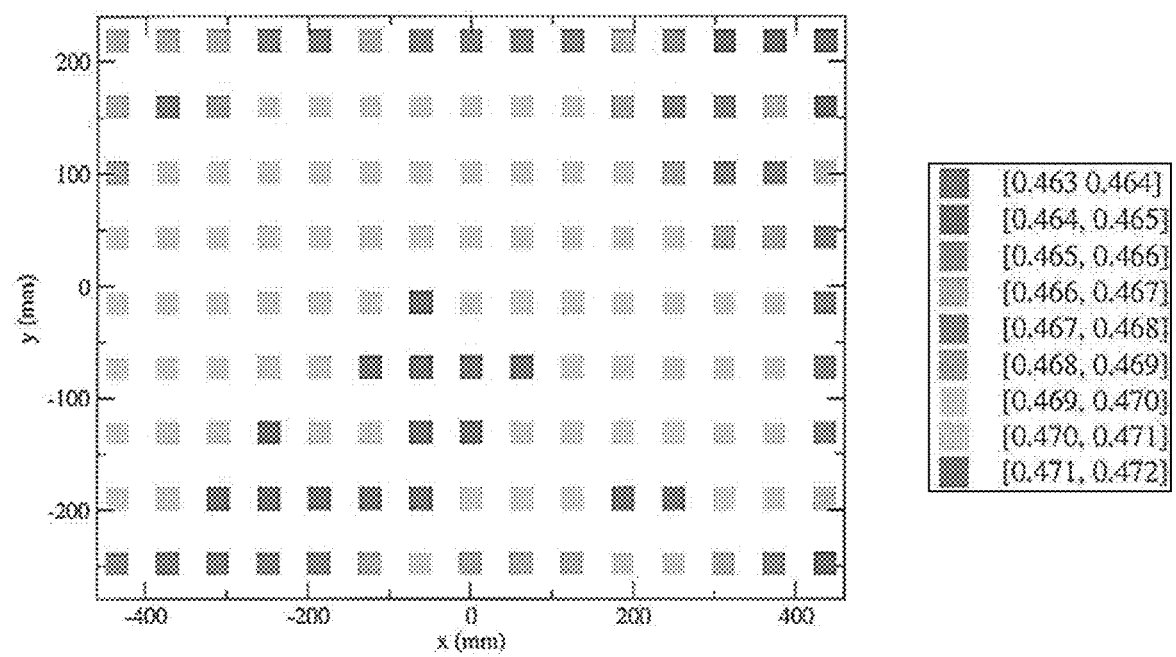

FIGS. 3A and 3B illustrate measurement plots that map u' and v' coordinates, respectively, of white point values on a display screen (e.g. display screen 126) of a display device (e.g., display device 100) without a color correction film (e.g., color correction film 240). The plot areas of FIGS. 3A and 3B may represent same area on the display screen. Different shades of squares in FIGS. 3A and 3B may represent different u' and v' coordinates, respectively, of white point values, and hence, indicate a variation in white point values across the display screen. The white point values may be calculated from optical measurements taken on the display screen using, for example, a spectrophotometer or a camera.

Figure 4:
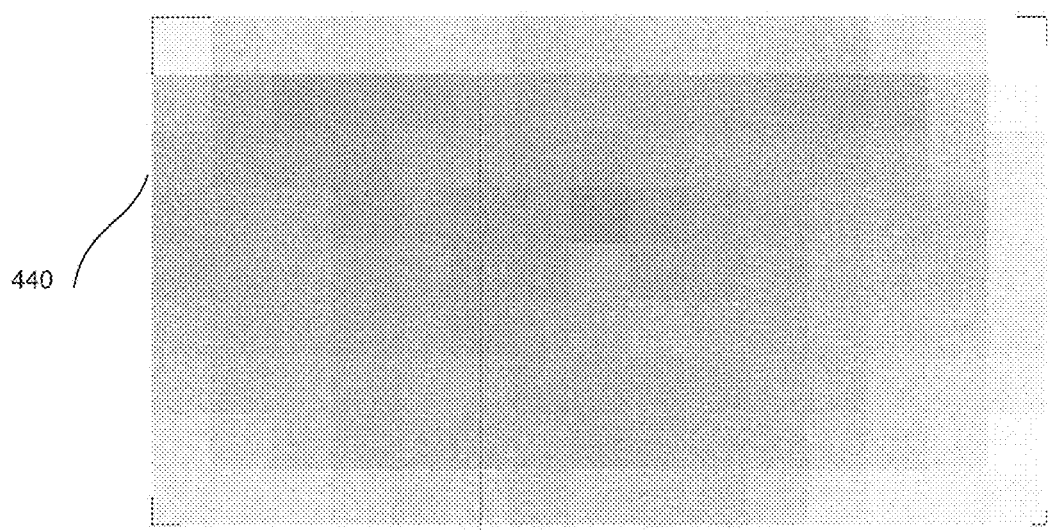
FIG. 4 illustrates a schematic top view of a color correction film. according to an embodiment.

FIG. 4 illustrates a top view of a color correction film 440 that may be similar in function as color correction film 240, as discussed above with reference to FIGS. 2B and 2C. Color correction film 440 includes an ink pattern of different colors and densities that are represented by different shades of gray in FIG. 4. The arrangement of the ink pattern is in a manner such that the variation of white point values as seen in FIGS. 3A and 3B is compensated to obtain the desired white point value across the display screen.

Figure 5A:
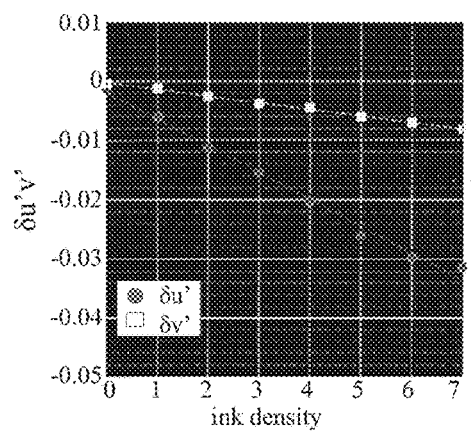
FIGS. 5A-5C illustrate plots of white point value variation for different inks and ink densities, according to various embodiments.
Figure 5B:
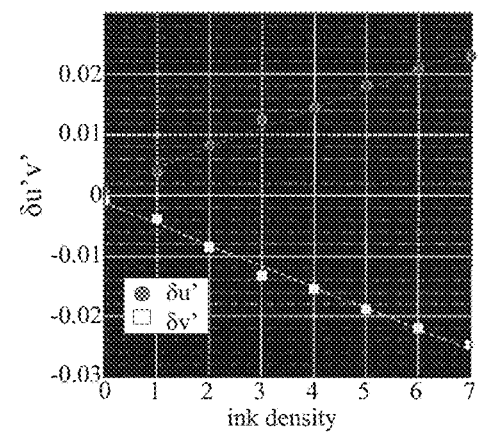
Figure 5C:
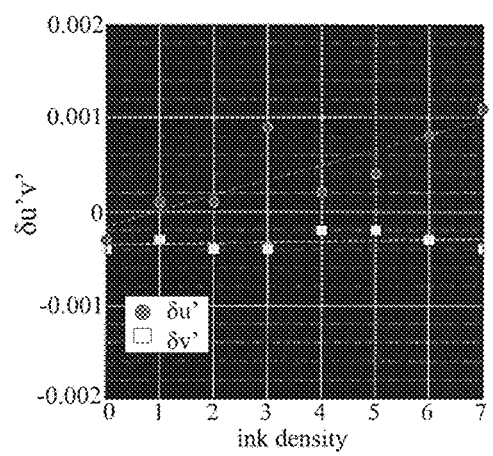

FIGS. 5A through 5C illustrate variation of white point values with respect to ink densities of different colors. For example, FIGS. 5A, 5B, and 5C show variations of u' and v' coordinates of white point values with respect to cyan, magenta, and yellow ink densities, respectively. Using these relationships of white point value with ink densities, the density of ink pattern of FIG. 4 may be calculated to compensate for variation in white point values as seen in FIGS. 3A and 3B.

Figure 6A:
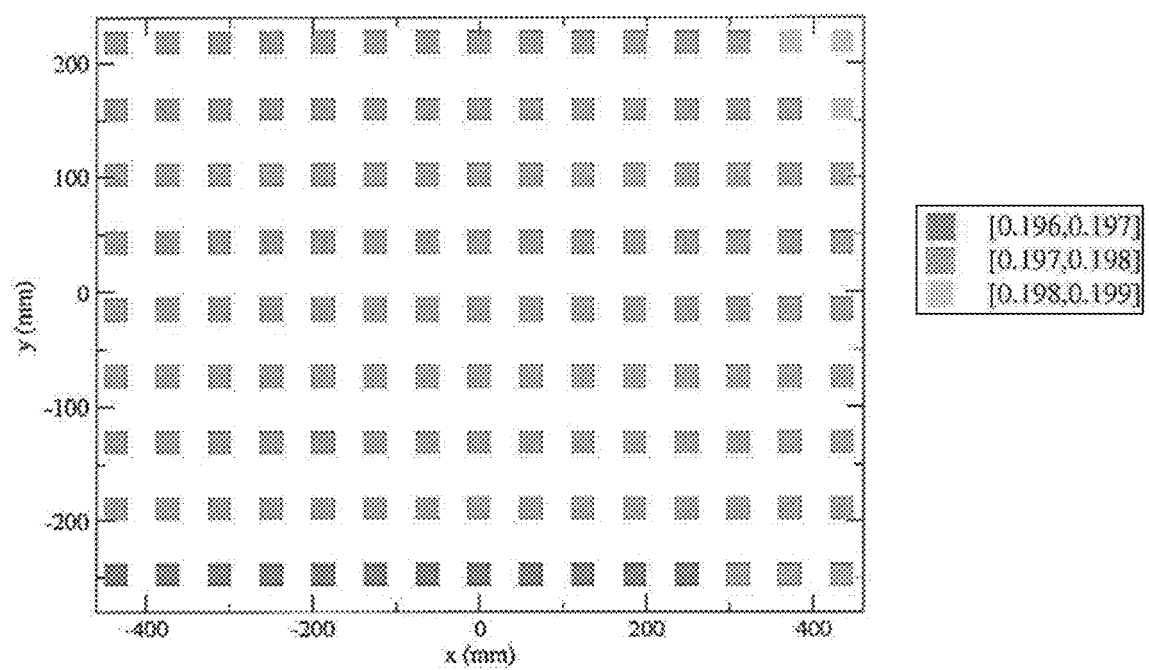
FIGS. 6A-6B illustrate optical measurements of a display device after white point value correction, according to an embodiment.
Figure 6B:
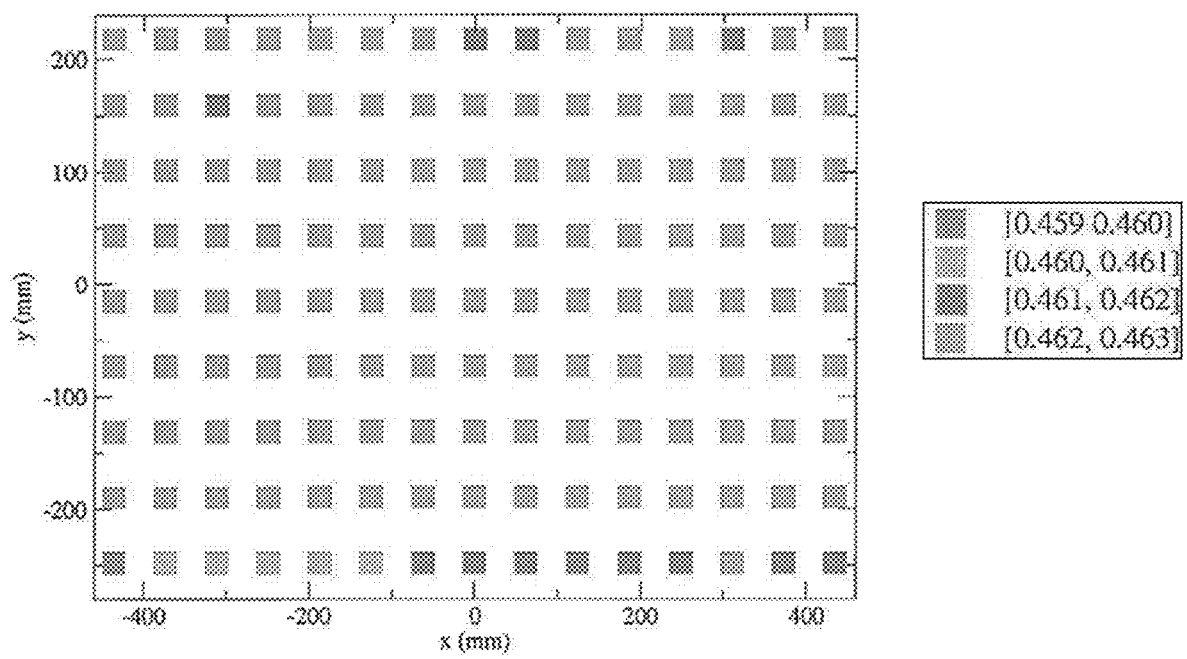

FIGS. 6A and 6B illustrate measurement plots after placing color correction film 440 of FIG. 4 in display device of FIGS. 3A and 3B in a manner similar to that described with reference to color correction film 240 of FIG. 2B. These plots of FIGS. 6A and 6B map u' and v' coordinates, respectively, of white point values on same area of the display screen as used in FIGS. 3A and 3B. Number of different shades of squares in FIGS. 6A and 6B corresponding to different u' and v' coordinates are reduced compared to that seen in FIGS. 3A and 3B, which indicate reduced variation in white point values across the display screen due to presence of color correction film in the display device.

Example Embodiments of Luminescent Nanocrystal Phosphors

Described herein are various compositions comprising nanocrystals, including luminescent nanocrystals. The various properties of the luminescent nanocrystals, including their absorption properties, emission properties and refractive index properties, may be tailored and adjusted for various applications. As used herein, the term "nanocrystal" refers to nanostructures that are substantially monocrystalline. A nanocrystal may have at least one region or characteristic dimension with a dimension of less than about 500 nm, and down to less than about 1 nm. The terms "nanocrystal," "nanodot," "dot," and "QD" are readily understood by the ordinarily skilled artisan to represent like structures and are used herein interchangeably. The present invention also encompasses the use of polycrystalline or amorphous nanocrystals. As used herein, the term "nanocrystal" also encompasses "luminescent nanocrystals." As used herein, the term "luminescent nanocrystals" may mean nanocrystals that emit light when excited by an external energy source.

The material properties of nanocrystals may be substantially homogenous, or in certain embodiments, may be heterogeneous. The optical properties of nanocrystals may be determined by their particle size, chemical or surface composition. The ability to tailor the luminescent nanocrystal size in the range between about 1 nm and about 15 nm may enable photoemission coverage in the entire optical spectrum to offer great versatility in color rendering. Particle encapsulation may offer robustness against chemical and UV deteriorating agents.

Nanocrystals, including luminescent nanocrystals, for use in embodiments described herein may be produced using any method known to those skilled in the art. Suitable methods and example nanocrystals are disclosed in U.S. Pat. No. 7,374,807; U.S. patent application Ser. No. 10/796,832, filed Mar. 10, 2004; U.S. Pat. No. 6,949,206; and U.S. Provisional Patent Application No. 60/578,236, filed Jun. 8, 2004, the disclosures of each of which are incorporated by reference herein in their entireties.

Luminescent nanocrystals for use in embodiments described herein may be produced from any suitable material, including an inorganic material, and more suitably an inorganic conductive or semiconductive material. Suitable semiconductor materials may include those disclosed in U.S. patent application Ser. No. 10/796,832, and may include any type of semiconductor, including group II-VI, group III-V, group IV-VI and group IV semiconductors. Suitable semiconductor materials may include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTe, BeS, BeSe, BeTe, MgS, MgSe, GeS, GeSe, GeTe, SuS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO$, and an appropriate combination of two or more such semiconductors.

In certain embodiments, the nanocrystals may comprise a dopant from the group consisting of a p-type dopant or an n-type dopant. The nanocrystals useful herein may also comprise II-VI or III-V semiconductors. Examples of II-VI or III-V semiconductor nanocrystals may include any combination of an element from Group II, such as Zn, Cd and Hg, with any element from Group VI, such as S, Se, Te and Po, of the Periodic Table; and any combination of an element from Group III, such as B, Al, Ga, In, and Tl, with any element from Group V, such as N, P, As, Sb and Bi, of the Periodic Table.

The nanocrystals, including luminescent nanocrystals, described herein may also further comprise ligands conjugated, cooperated, associated or attached to their surface. Suitable ligands may include any group known to those skilled in the art, including those disclosed in U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosures of each of which are incorporated herein by reference. Use of such ligands may enhance the ability of the nanocrystals to incorporate into various solvents and matrixes, including polymers. Increasing the miscibility (i.e., the ability to be mixed without separation) of the nanocrystals in various solvents and matrixes may allow them to be distributed throughout a polymeric composition such that the nanocrystals do not aggregate together and therefore do not scatter light. Such ligands are described as "miscibility-enhancing" ligands herein.

In certain embodiments, compositions comprising nanocrystals distributed or embedded in a matrix material are provided. Suitable matrix materials may be any material known to the ordinarily skilled artisan, including polymeric materials, organic and inorganic oxides. Compositions described herein may be layers, encapsulants, coatings, sheets or films. It should be understood that in embodiments described herein where reference is made to a layer, polymeric layer, matrix, sheet or film, these terms are used interchangeably, and the embodiment so described is not limited to any one type of composition, but encompasses any matrix material or layer described herein or known in the art.

Down-converting nanocrystals (for example, as disclosed in U.S. Pat. No. 7,374,807) utilize the emission properties of luminescent nanocrystals that are tailored to absorb light of a particular wavelength and then emit at a second wavelength, thereby providing enhanced performance and efficiency of active sources (e.g., LEDs).

While any method known to the ordinarily skilled artisan may be used to create nanocrystals (luminescent nanocrystals), a solution-phase colloidal method for controlled growth of inorganic nanomaterial phosphors may be used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," *J. Am. Chem. Soc.* 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," *J Am. Chem. Sac.* 115: 8706 (1993), the disclosures of which are incorporated by reference herein in their entireties. This manufacturing process technology leverages low cost processability without the need for clean rooms and expensive manufacturing equipment. In these methods, metal precursors that may undergo pyrolysis at high temperature are rapidly injected into a hot solution of organic surfactant molecules. These precursors may break apart at elevated temperatures and react to nucleate nanocrystals. After this initial nucleation phase, a growth phase may begin by the addition of monomers to the growing crystal. The result may be freestanding crystalline nanoparticles in solution that may have an organic surfactant molecule coating their surface.

Utilizing this approach, synthesis may occur as an initial nucleation event that takes place over seconds, followed by crystal growth at elevated temperature for several minutes. Parameters such as the temperature, types of surfactants present, precursor materials, and ratios of surfactants to monomers may be modified so as to change the nature and progress of the reaction. The temperature controls the structural phase of the nucleation event, rate of decomposition of precursors, and rate of growth. The organic surfactant molecules may mediate both solubility and control of the nanocrystal shape. The ratio of surfactants to monomer, surfactants to each other, monomers to each other, and the individual concentrations of monomers may strongly influence the kinetics of growth.

According to an embodiment, CdSe may be used as the nanocrystal material, in one example, for visible light down-conversion, due to the relative maturity of the synthesis of this material. Due to the use of a generic surface chemistry, it may also possible to substitute non-cadmium-containing nanocrystals.

In semiconductor nanocrystals, photo-induced emission arises from the band edge states of the nanocrystal. The band-edge emission from luminescent nanocrystals competes with radiative and non-radiative decay channels originating from surface electronic states. X. Peng, et al., *J Am. Chem, Soc.* 30:7019-7029 (1997). As a result, the presence of surface defects such as dangling bonds provide non-radiative recombination centers and contribute to lowered emission efficiency. An efficient and permanent method to passivate and remove the surface trap states may be to epitaxially grow an inorganic shell material on the surface of the nanocrystal, X. Peng, et al., *J. Am. Chem. Soc.* 30:7019-7029 (1997). The shell material may be chosen such that the electronic levels are type 1 with respect to the core material (e.g., with a larger bandgap to provide a potential step localizing the electron and hole to the core). As a result, the probability of non-radiative recombination may be reduced.

Core-shell structures may be obtained by adding organo-metallic precursors containing the shell materials to a reaction mixture containing the core nanocrystal. In this case, rather than a nucleation event followed by growth, the cores act as the nuclei, and the shells may grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and to ensure solubility. A uniform and epitaxially grown shell may be obtained when there is a low lattice mismatch between the two materials.

Example materials for preparing core-shell luminescent nanocrystals may include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdTe, HgS, HgSe, HgTc, BeS, BcSe, BcTe, MgS, MgSe, GeS, GeSe, GeTe, SnS, SnSe, SnTe, PbO, PbS, PbSe, PbTe, CuP, CuCl, CuBr, CuI, $Si_3N_4$, $Ge_3N_4$, $Al_2O_3$, $(Al, Ga, In)_2 (S, Se, Te)_3$, AlCO, and shell luminescent nanocrystals for use in the practice of the present invention include, but are not limited to, (represented as Core/Shell), CdSe/ZnS, InP/ZnS, InP/ZnSe, PbSe/PbS, CdSe/CdS, CdTe/CdS, CdTe/ZnS, as well as others.

As used throughout, a plurality of phosphors or a plurality of luminescent nanocrystals means more than one phosphor or luminescent nanocrystal (i.e., 2, 3, 4, 5, 10, 100, 1,000, 1,000,000, etc., nanocrystals). The compositions will suitably comprise phosphors or luminescent nanocrystals having the same composition, though in further embodiments, the plurality of phosphors or luminescent nanocrystals may be various different compositions. For example, the luminescent nanocrystals may all emit at the same wavelength, or in further embodiments, the compositions may comprise luminescent nanocrystals that emit at different wavelengths.

Luminescent nanocrystals for use in the embodiments described herein may be less than about 100 nm in size, and down to less than about 2 nm in size and invention absorb visible light. As used herein, visible light is electromagnetic radiation with wavelengths between about 380 and about 780 nanometers that is visible to the human eye. Visible light can be separated into the various colors of the spectrum, such as red, orange, yellow, green, blue, indigo and violet. Blue light may comprise light between about 435 nm and about 500 nm, green light may comprise light between about 520 nm and 565 nm and red light may comprise light between about 625 nm and about 740 nm in wavelength.

According to various embodiments, the luminescent nanocrystals may have a size and a composition such that they absorb photons that are in the ultraviolet, near-infrared, and/or infrared spectra. The ultraviolet spectrum may comprise light between about 100 nm to about 400 nm, the near-infrared spectrum may comprise light between about 750 nm to about 100 µm in wavelength, and the infrared spectrum may comprise light between about 750 nm to about 300 µm in wavelength.

While luminescent nanocrystals of any suitable material may be used in the various embodiments described herein, in certain embodiments, the nanocrystals may be ZnS, InAs, CdSe, or any combination thereof to form a population of nanocrystals for use in the embodiments described herein. As discussed above, in further embodiments, the luminescent nanocrystals may be core/shell nanocrystals, such as CdSe/ZnS, InP/ZnSe, CdSe/CdS or InP/ZnS.

According to various embodiments, the luminescent nanocrystals may include at least one population of luminescent nanocrystals capable of emitting red light and/or at least one population of luminescent nanocrystals capable of emitting green light upon excitation by a blue/UV light source. The luminescent nanocrystal wavelengths and concentrations may be adjusted to meet the optical performance required. In other embodiments, the luminescent nanocrystals phosphor material may comprise a population of luminescent nanocrystals which absorb wavelengths of light having undesirable emission wavelengths, and reemit secondary light having a desirable emission wavelength. In this manner, the luminescent nanocrystal films described herein may comprise at least one population of color-filtering luminescent nanocrystals to further tune the BLU emission and to reduce or eliminate the need for color filtering.

Suitable luminescent nanocrystals, methods of preparing luminescent nanocrystals, including the addition of various solubility-enhancing ligands, can be found in Published U.S. Patent Publication No. 2012/0113672, the disclosure of which is incorporated by reference herein in its entirety.

Example Embodiments of Compositions of Phosphors

As used herein, the term "phosphors" refers to a synthetic fluorescent or phosphorescent substance. Example phosphors include traditional materials such as cerium(II)-doped YAG phosphors (YAG:Ce$^{3+}$, or Y$_3$Al$_5$O$_{12}$:Ce$^{3+}$), as well as luminescent nanocrystals, as described herein. Additional phosphors that may be utilized in display devices, such as display device 100, described herein include, but are not limited to, silicate phosphors, garnet phosphors, aluminate phosphors, nitride phosphors, NYAG phosphors, SiAlON phosphors and CaAlSiN$_3$-based (CASN) phosphors, as well as other phosphors known in the art.

As described throughout, compositions comprising phosphors for use in, for example, phosphor film 114 (as described with reference to FIG. 2), may have numerous shapes, including for example, films or sheets. In further embodiments, the compositions may be various containers or receptacles for receiving the phosphors, suitably luminescent nanocrystals.

Suitably, phosphors, and specifically luminescent nanocrystals, may be dispersed or embedded in suitable polymeric materials and sandwiched between one or more barrier layers on either side of the matrix to create films or sheets, such as phosphor film 114, also called quantum dot enhancement films (QDEFs). Such films are described, for example, in U.S. Patent Publication Nos. 2010/0110728 and 2012/0113672, the disclosures of each of which are incorporated by reference herein in their entireties.

The luminescent nanocrystals of phosphor film 114 may be coated with one or more ligand coatings, embedded in one or more films or sheets, and/or sealed by one or more barrier layers. Such ligands, films, and barriers may provide photostability to the luminescent nanocrystals and protect the luminescent nanocrystals from environmental conditions including elevated temperatures, high intensity light, external gases, moisture, and other harmful environmental conditions. Additional effects may be achieved with these materials, including a desired index of refraction in the host film material, a desired viscosity or luminescent nanocrystal dispersion/miscibility in the host film material, and other desired effects. In embodiments, the ligand and film materials will be chosen to have a sufficiently low thermal expansion coefficient, such that thermal curing does not substantially affect the luminescent nanocrystal phosphor material.

The luminescent nanocrystals of phosphor film 114 may comprise ligands conjugated to, cooperated with, associated with, or attached to their surface. In an embodiment, the luminescent nanocrystals may include a coating layer comprising ligands to protect the luminescent nanocrystals from external moisture and oxidation, control aggregation, and allow for dispersion of the luminescent nanocrystals in the matrix material. Ligands and matrix materials, as well as methods for providing such materials, are described herein. Additional ligands and film materials, as well as methods for providing such materials, include any group known to those skilled in the art, including those disclosed in U.S. Patent Publication No. 2012/0113672; U.S. Pat. No. 8,283,412; U.S. Patent Publication No. 2008/0237540; U.S. Patent Publication No. 2010/0110728; U.S. Pat. Nos. 8,563,133; 7,645,397; 7,374,807; 6,949,206; 7,572,393; and 7,267,875, the disclosure of each of which is incorporated herein by reference in its entirety. Additionally, ligand and matrix materials may include any suitable materials in the art.

Dispersing luminescent nanocrystals in a polymeric material provides a method to seal the nanocrystals and provide a mechanism for mixing various compositions and sizes of luminescent nanocrystals. As used throughout, "dispersed" includes uniform (i.e., substantially homogeneous) as well as non-uniform (i.e., substantially heterogeneous) distribution or placement of luminescent nanocrystals.

Materials for use in the compositions (e.g., phosphor film 114) comprising the luminescent nanocrystals may include polymers and organic and inorganic oxides. Polymers may include any polymer known to the ordinarily skilled artisan that may be used for such a purpose. In an embodiment, the polymer may be substantially translucent or substantially transparent. Matrix materials may include, but are not limited to, epoxies; acrylates: norborene; polyethylene; polyvinyl butyral):poly(vinyl acetate); polyurea; polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with Bifunctional monomers, such as divinylbenzene; cross-linkers suitable for cross-linking ligand materials; epoxides which combine with ligand amines (e.g., APS or PEI ligand amines) to form epoxy, and the like.

The luminescent nanocrystals as described herein may be embedded in a polymeric (or other suitable material, e.g., waxes, oils) matrix using any suitable method, for example, mixing the luminescent nanocrystals in a polymer and casting a film; mixing the luminescent nanocrystals with monomers and polymerizing them together; mixing the luminescent nanocrystals in a sol-gel, or any other method known to those skilled in the art. As used herein, the term "embedded" is used to indicate that the luminescent nanocrystals are enclosed or encased within the polymer. It should be noted that luminescent nanocrystals may be uniformly distributed throughout the composition, though in further embodiments they may be distributed according to an application-specific uniformity distribution function.

The thickness of the compositions (e.g., phosphor film 114) comprising luminescent nanocrystals as described herein may be controlled by any method known in the art, such as spin coating and screen printing. The luminescent nanocrystal compositions (e.g., phosphor film 114) as described herein may be any desirable size, shape, configuration and thickness. For example, the compositions (e.g., phosphor film 114) may be in the form of layers, as well as other shapes, for example, discs, spheres, cubes or blocks, tubular configurations and the like. The compositions (e.g. phosphor film 114) are on the order of about 100 mm in thickness (i.e., in one dimension), and down to on the order of less than about 1 mm in thickness. In other embodiments, the polymeric films may be on the order of 10's to 100's of microns in thickness. The luminescent nanocrystals may be embedded in the various compositions at any loading ratio that is appropriate for the desired function. For example, the luminescent nanocrystals may be loaded at a ratio of between about 0.001% and about 75% by volume depending upon the application, polymer and type of nanocrystals used. The appropriate loading ratios can readily be determined by the ordinarily skilled artisan and are described herein further with regard to specific applications. In an embodiment, the amount of nanocrystals loaded in a luminescent nanocrystal composition (e.g., in phosphor film 114) are on the order of about 10% by volume, to parts-per-million (ppm) levels.

It is to be understood that while certain embodiments have been illustrated and described herein, the claims are not to be limited to the specific forms or arrangement of parts described and shown. In the specification, there have been disclosed illustrative embodiments and, although specific terms are employed, they are used in a generic and descriptive sense only and not for purposes of limitation. Modifications and variations of the embodiments are possible in light of the above teachings. It is therefore to be understood that the embodiments may be practiced otherwise than as specifically described.

What is claimed is:

1. A device comprising:
    a backlight unit comprising:
        a light source unit having a light guide plate; and
        an optical processing unit comprising a quantum dot film coupled to the light source unit;
    an image generating unit comprising a display screen coupled to the backlight unit,
    wherein the backlight unit is configured to distribute light emitted by the quantum dot film across the display screen; and
    a color correction film comprising a patterned layer, wherein the color correction film is disposed between the quantum dot film and the light guide plate,
    wherein the patterned layer is configured to receive the light emitted by the quantum dot film and to tune white point values of the light emitted by the quantum dot film at different locations on the display screen to a desired white point value in order to achieve more uniform white point values across the display screen, and
    wherein the patterned layer comprises:
        a first pattern of a transparent polymeric material having a first color that is different from one or more colors of the light emitted by the quantum dot film, and
        a second pattern of another transparent polymeric material having a second color that is different from the first color and the one or more colors of the light emitted by the quantum dot film.

2. The device of claim 1, wherein the patterned layer is disposed on the quantum dot film.

3. The device of claim 1, wherein the patterned layer is disposed on a substrate that is disposed on the quantum dot film.

4. The device of claim 1, wherein the image generating unit further comprises a liquid crystal display module coupled to the display screen, wherein the patterned layer is disposed on the liquid crystal display module.

5. The device of claim 1,
    wherein the first and second patterns are configured to receive the light emitted by the quantum dot film and to tune white point values of the light emitted by the quantum dot film at first and second locations, respectively, on the display screen, the first and second locations being different from each other.

6. The device of claim 1, wherein:
    the first pattern of the transparent polymeric material has a first density; and
    the second pattern of the transparent polymeric material has a second density, the first and second densities being different from each other,
    wherein the first and second patterns are configured to receive the light emitted by the quantum dot film and to tune white point values of the light emitted by the quantum dot film at first and second locations, respectively, on the display screen, the first and second locations being different from each other.

7. The device of claim 1, wherein:
    the first pattern of the transparent polymeric material comprises a yellow color film; and
    the second pattern of the transparent polymeric material comprises a cyan color film.

8. The device of claim 1, wherein the light source unit comprises a light emitting diode.

9. The device of claim 1, wherein the light source unit comprises an array of light emitting diodes facing a bottom surface of the quantum dot film.

10. The device of claim 1, wherein the optical processing unit further comprises:
    a brightness enhancing film coupled to the quantum dot film; and a polarizing film coupled to the brightness enhancing film.

11. The device of claim 1, wherein the quantum dot film comprises a plurality of quantum dots configured to emit red light.

12. The device of claim 1, wherein the quantum dot film comprises a plurality of quantum dots configured to emit green light.

13. The device of claim 1, wherein the quantum dot film comprises:
   a first plurality of quantum dots configured to emit red light; and
   a second plurality of quantum dots configured to emit green light.

14. The device of claim 1, wherein the device comprises at least one of a display device, a liquid crystal display device, a computer, a tablet, a hand-held device, a phone, a wearable device, and a TV.

15. A method of obtaining uniform white point values of light distributed by a backlight unit of a display device, the method comprising:
   providing a light source unit;
   providing an optical processing unit comprising a quantum dot film;
   providing an image generating unit; and
   providing a color correction film comprising a layer of patterned material to tune white point values of the distributed light to a desired white point value in order to achieve more uniform white point values across the display screen;
   wherein the providing the color correction film comprising the layer of patterned material comprises:
      determining the white point values of the distributed light at different locations on the display screen without the layer of patterned material;
      comparing each of the determined white point values with the desired white point value;
      determining a pattern to correct one or more white point values of the determined white point values in response to the one or more white point values being larger or smaller than the desired white point value by a predetermined value;
      determining a first color for a first sub-pattern of the pattern, wherein the first color is different from one or more colors of light emitted by the quantum dot film; and
      determining a second color for a second sub-pattern of the pattern, wherein the second color is different from the first color and the one or more colors of light emitted by the quantum dot film.

16. The method of claim 15, further comprising
   determining density for material of each sub-pattern of the pattern.

17. The method of claim 15, wherein the providing of the layer of patterned material comprises disposing the layer of patterned material on a light guide plate of the light source unit.

18. The method of claim 15, wherein the providing of the layer of patterned material comprises disposing the layer of patterned material on the quantum dot film of the optical processing unit.

19. The method of claim 15, wherein the providing of the layer of patterned material comprises disposing the layer of patterned material on a liquid crystal display module of the image generating unit.

20. The method of claim 15, wherein the providing of the layer of patterned material comprises:
   disposing the layer of patterned material on a substrate; and
   disposing the substrate on a quantum dot film of the optical processing unit.

* * * * *